Patented Mar. 22, 1932                                    1,850,841

UNITED STATES PATENT OFFICE

PAUL LAEUGER, OF BASEL, SWITZERLAND, ASSIGNOR TO THE FIRM J. R. GEIGY S. A., OF BASEL, SWITZERLAND

MANUFACTURE OF ACID DYESTUFFS OF THE PHENONAPHTHOSAFRANINE SERIES AND THE PRODUCTS

No Drawing. Application filed February 9, 1928, Serial No. 253,217, and in Germany February 19, 1927.

The U. S. patent application Ser. No. 166,021, filed February 4, 1927, discloses an improved manufacture of acid dyestuffs of the phenonaphthosafranine series, which can be obtained by condensing an unsymmetrical N-alkyl-paraphenylene-diamine derivative having a sulpho-group in ortho position to the primary amino group according to the formula:

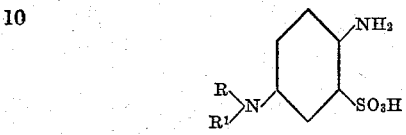

with an isorosindulinesulphonic acid of the general formula:

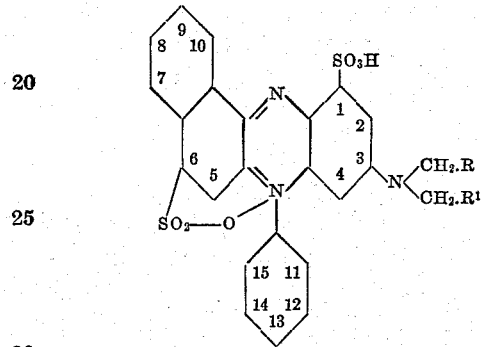

having at least two sulpho-groups, one of them being in position 6, the other in position 1, and a third, if it be present, in any position, whereby in the above formulæ R and $R^1$ stand for hydrogen or alkyl.

It was supposed that the origin of the fastness to alkali of the dyestuffs described in the above said application was due to the presence of a sulpho-group in ortho-position to the bridge-nitrogen (the 16-position), since only quite definite sulphonic acids of unsymmetrical N-alkylated para-phenylenediamines were found to give rise to these fast dyestuffs.

The present invention is based on the observation that dyestuffs equally fast to alkali containing a sulpho-group in ortho-(16)-position can be obtained by treating with sulphonating agents certain phenonaphthosafranines nonsulphonated in the unsymmetrical N-alkylated para-phenylene-diamine residue attached by condensation.

The effect of this sulphonation in the 16-position extends, however, not only to the formation of dyestuffs fast to alkali, but also to an essential improvement of the tint, since products which before sulphonation dye muddy and reddish-blue tints yield on sulphonation pure and greenish blue dyestuffs.

As parent materials for the invention may be used the phenonaphthosafranine monosulphonic acids which may be regarded as derived from the following general formula:—

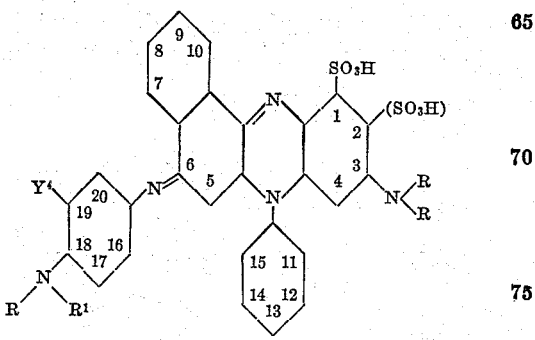

in which R=alkyl, $R^1$=hydrogen or alkyl and $Y^4$=hydrogen or a neutral-group. A neutral substituent in position 19 is favourable, since it may facilitate the entry of the sulpho-group into the position (16) which is para to it. Such a group may be alkyl, chlorine, alkyloxy. While the isorosinduline amino-group in position 3 must be dialkylated, the amino-group in the phenylenediamine nucleus attached by oxidation may be dialkylated or monoalkylated; the dyestuffs with free amino-groups are excluded.

The formation of acid wool dyestuffs of the the phenonaphthosafranine series by sulphonation of parent dyestuffs similar to those here in question, has already been proposed in the German patent specification No. 97,365 and in the British patent specification No. 24,410 of 1897. In these specifications use is made of the well-known effect of sulphonation in rendering sparingly soluble dyestuffs more soluble, and it is merely stated that the dyestuffs obtained are easily soluble and dye wool in an acid bath. It was stated that the blue acid dyestuffs obtainable by the directions given gave dyeings which were not fast to alkali and whose tints differed but little from that of the parent dyestuff. Not only are the parent dyestuffs of the present invention not further described in the two specifications aforesaid, but also the sulphonated products are referred to only in a general way without description and are not claimed. Also the sulphonic acids obtained according to French specification No. 573,368 (Example 3) are dyestuffs which are not fast to alkali notwithstanding that the sulpho-group contained therein in ortho-position to the azine-nitrogen might lead one to expect a fastness to alkali analogous to other cases. In these prior instances the phenonaphthosafranine dyestuffs in question contain a free amino-group in the para-phenylenediamine residue attached by condensation. The sulphonation of such derivatives is excluded from this invention.

The sulphonation for the purpose of this invention may be performed with feebly fuming sulphuric acid or even by sulphuric acid monohydrate.

The following example illustrates the invention, the parts being by weight:

The 3-diethylphenonaphthosafranine-2-sulphonic acid of the probable constitution

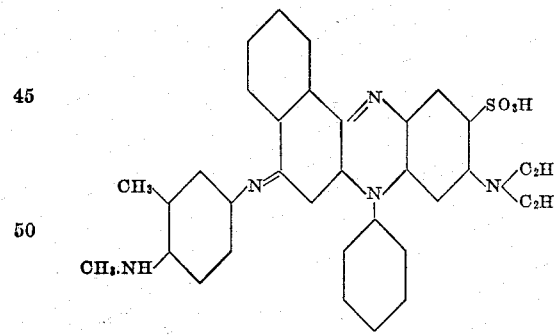

is sulphonated by introducing 1 part of it into 5 parts of fuming sulphuric acid of 20 per cent. strength and heating the mixture for 6-7 hours at 80-90° C. The whole is then poured upon ice and the free 2:16-disulphonic acid filtered and converted into its sodium salt. This dyestuff dyes wool in an acid bath pure blue tints of excellent fastness to alkali and light; it is identical with the dyestuff of Example 1 of the aforesaid U. S. patent application Ser. No. 166,021.

What I claim is:
1. A process for the manufacture of acid dyestuffs of the phenonaphthosafranine series which are fast to alkali, consisting in treating with a sulphonating agent an alkylated phenonaphthosafraninesulphonic acid having at least three alkyl groups and being of the following presumed general formula:

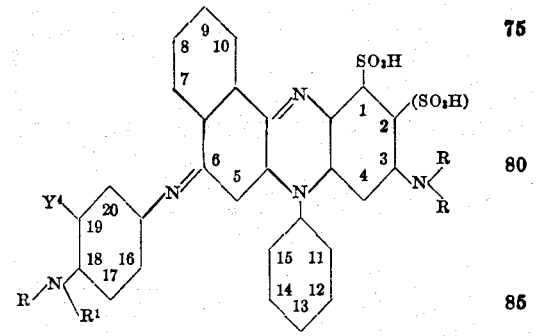

wherein $R$=alkyl, $R^1$=alkyl or hydrogen, $Y^4$=hydrogen or a neutral group and where a sulpho-group is in one of the positions 1 and 2.

2. A process for the manufacture of acid dyestuffs of the phenonaphthosafranine series which are fast to alkali, consisting in treating the 3-diethylphenonaphthosafranine-1-sulphonic acid of the probable constitution

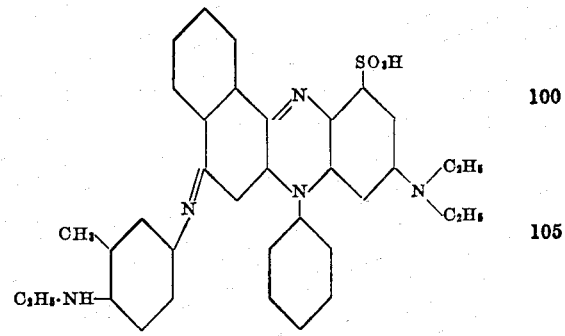

with a sulphonating agent.

3. A process for the manufacture of acid dyestuffs of the phenonaphthosafranine series which are fast to alkali, consisting in treating the 3-diethylphenonaphthosafranine-1-sulphonic acid of the probable constitution:

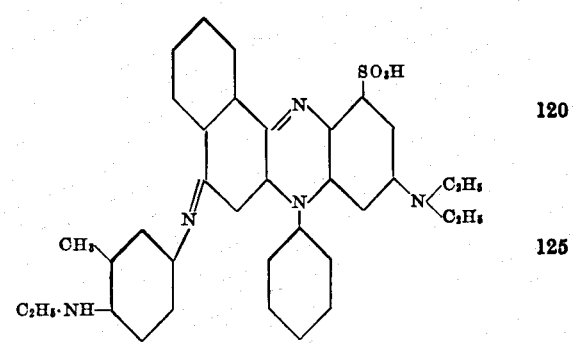

with fuming sulphuric acid.

4. As new articles of manufacture, the hereinbefore described acid dyestuffs of the phenonaphthosafranine series having the following general formula:

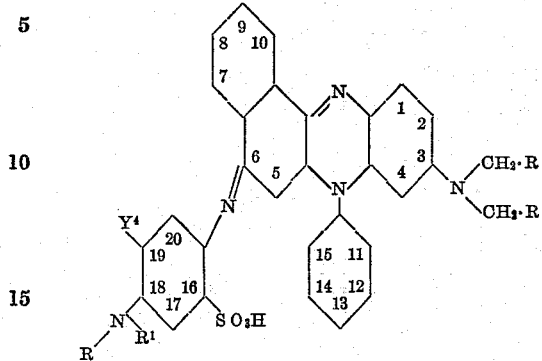

wherein R=alkyl, R¹=alkyl or hydrogen, Y⁴=hydrogen or a neutral group and where a sulpho-group is in one of the positions 1 and 2, said dyestuffs constituting bronze powders, dissolving easily in water to a blue solution and in concentrated sulphuric acid to a green solution and dyeing wool in a sulphuric acid bath pure, greenish blue tints of excellent fastness to alkali.

5. As a new article of manufacture, the hereinbefore described dyestuff of the phenonaphthosafranine series having the following formula:

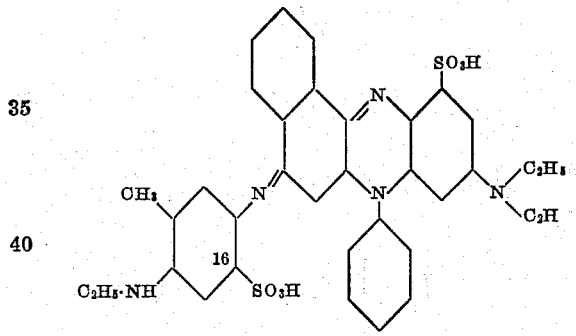

said dyestuff constituting a bronze powder, dissolving easily in water to a blue solution and in concentrated sulphuric acid to a green solution and dyeing wool in a sulphuric acid bath pure, greenish blue tints of excellent fastness to alkali.

In witness whereof I have hereunto signed my name this 26th day of January, 1928.

PAUL LAEUGER.